Jan. 24, 1967   W. B. SPONSLER   3,299,978
SURFACE VEHICLE HAVING SELECTIVELY POSITIONABLE PLURAL WALKING
BEAM RUNNING GEAR MEANS

Filed July 30, 1964   5 Sheets-Sheet 1

INVENTOR.
WILLIAM B. SPONSLER
BY
Edward A. Sokolski
ATTORNEY

Jan. 24, 1967 W. B. SPONSLER 3,299,978
SURFACE VEHICLE HAVING SELECTIVELY POSITIONABLE PLURAL WALKING
BEAM RUNNING GEAR MEANS
Filed July 30, 1964 5 Sheets-Sheet 2

INVENTOR.
WILLIAM B. SPONSLER
BY
Edward A. Sokolow
ATTORNEY

Jan. 24, 1967   W. B. SPONSLER   3,299,978
SURFACE VEHICLE HAVING SELECTIVELY POSITIONABLE PLURAL WALKING
BEAM RUNNING GEAR MEANS
Filed July 30, 1964   5 Sheets-Sheet 3

INVENTOR.
WILLIAM B. SPONSLER
BY Edward A. Sokolski
ATTORNEY

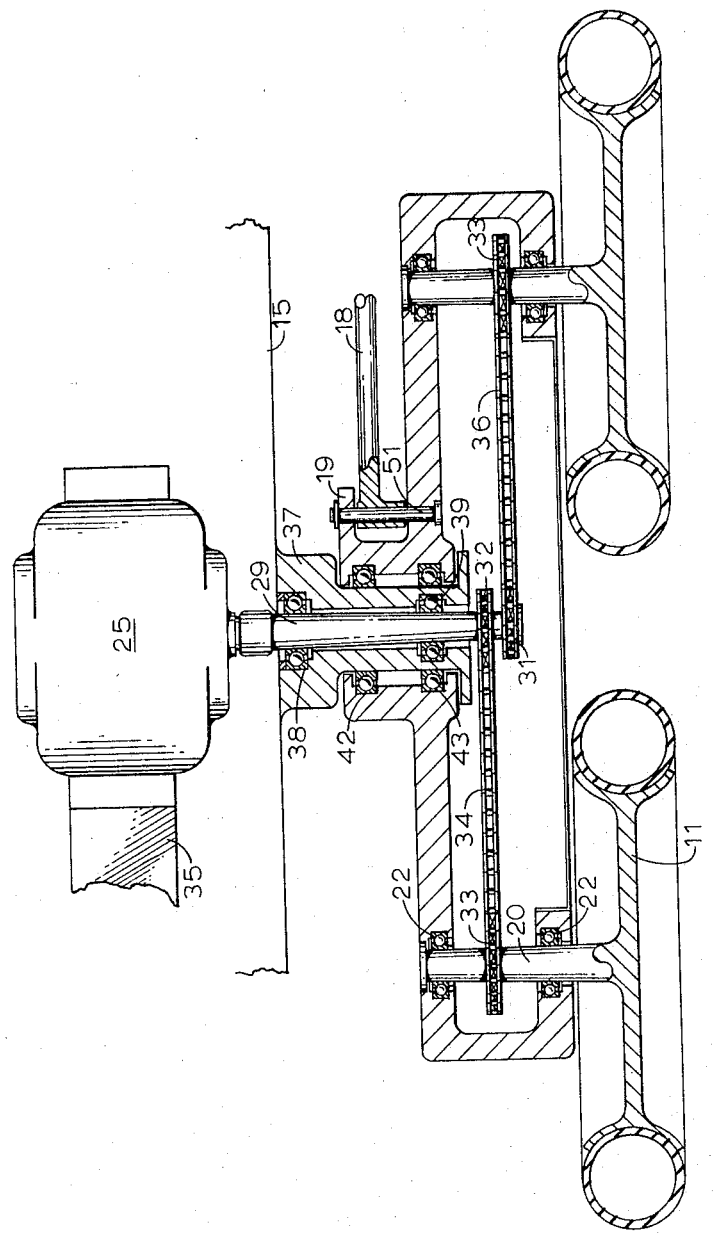

Jan. 24, 1967 W. B. SPONSLER 3,299,978
SURFACE VEHICLE HAVING SELECTIVELY POSITIONABLE PLURAL WALKING
BEAM RUNNING GEAR MEANS
Filed July 30, 1964 5 Sheets-Sheet 5

INVENTOR.
WILLIAM B. SPONSLER
BY
*Edward A. Sokolski*
ATTORNEY

United States Patent Office 3,299,978
Patented Jan. 24, 1967

3,299,978
SURFACE VEHICLE HAVING SELECTIVELY POSITIONABLE PLURAL WALKING BEAM RUNNING GEAR MEANS
William B. Sponsler, Rolling Hills, Calif., assignor to Northrop Corporation, Beverly Hills, Calif., a corporation of California
Filed July 30, 1964, Ser. No. 386,241
5 Claims. (Cl. 180—9.52)

This invention relates to a surface vehicle and more particularly to such a vehicle capable of performing a variety of functions which has features making it especially suitable for use in exploring remote areas.

In traveling over remote, rough, unexplored areas, a surface vehicle of great versatility and reliability is required. Such a vehicle should be able to climb over all sorts of obstacles, should be able to extricate itself if it becomes caught on an obstacle and should be capable of high maneuverability. In addition, high reliability is essential, and along these lines, features facilitating emergency repairs are highly desirable.

In view of the unforseeability of the type of surfaces that may be encountered, it is also important that the vehicle be adaptable for efficient operation under all types of surface conditions. Tracked vehicles, while they have excellent maneuverability and operate quite efficiently in traversing surfaces with crevices and soft soil, have very poor reliability in view of the tendency for their tracks to become jammed or thrown. Further, in traveling over strong relatively even surfaces, the efficiency of tracked vehicles is extremely low as compared with wheeled vehicles. Tracked vehicles further have a limited capability in traversing steep obstacles. Specialized wheeled vehicles of the prior art designed for rough terrain, on the other hand, lack the ability to traverse crevices and the like, are inefficient on soft soil, and tend to have limited maneuverability and stability.

The device of this invention overcomes the shortcomings of both tracked vehicles and specialized wheeled vehicles of the prior art in providing a vehicle capable of being adapted by the operator thereof to operate efficiently under all types of surface conditions. The device of the invention has characteristics comparable to those of a tracked vehicle on soft ground and crevices and has a superior ability to traverse steep obstacles. It additionally has the high maneuverability of such tracked vehicles. At the same time, the vehicle of the device of the invention utilizes wheels for locomotion and is capable of operating over relatively hard even surfaces with the efficiency and reliability of wheeled vehicles. Along with the aforementioned capabilities, the device of the invention can be adapted to perform a number of accessory functions, such as, those of a lift truck, cargo handling device, or observation paltform and can operate satisfactorily despite failures in some of its wheels or parts associated therewith. Further, the device of the invention is designed so that repairs on such components can be quickly and easily effected without the need for jacks or similar mechanisms.

Such operation is achieved in the device of the invention by providing at least four pairs of wheels, two pairs arranged on each side of the vehicle. Each pair of such wheels is rotatably mounted on a support or walking beam. Means are provided for rotatably driving each pair of wheels on its associated support beam. The support beams are each rotatably mounted on the chassis of the vehicle, and means are provided to rotatably position each of the support beams relative to the chassis and to alternatively either rigidly lock each of such beams in any selected angular position or to constrain the beams in a damped manner in such position. If so desired, the beam rotating mechanism may also be set to provide rotational freedom for the beams to permit the wheels to freely follow the contour of terrain.

It is therefore an object of this invention to provide a versatile land vehicle suitable for exploration and rough surface operations.

It is a further object of this invention to provide a land vehicle having greater reliability than similar prior art vehicles.

It is still another object of this invention to provide an improved land vehicle which can readily be adapted to operate efficiently under a wide variety of surface conditions.

It is still a further object of this invention to provide an improved surface vehicle of relatively simple construction which has high maneuverability and the ability to traverse relatively steep obstacles.

It is still another object of this invention to provide a vehicle with the inherent capability of being levelled in accordance with terrain conditions.

Other objects of this invention will become apparent from the following description taken in connection with the accompanying drawings of which:

Figure 2:
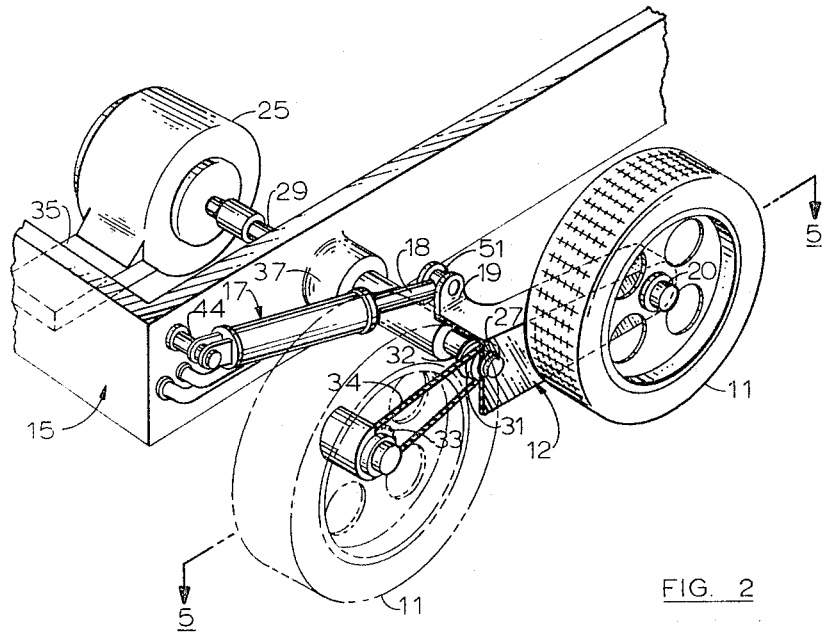
FIG. 2 is a perspective view with partial cutaway section of one of the locomotion and suspension units utilized in the embodiment of FIG. 1.
Figure 4:
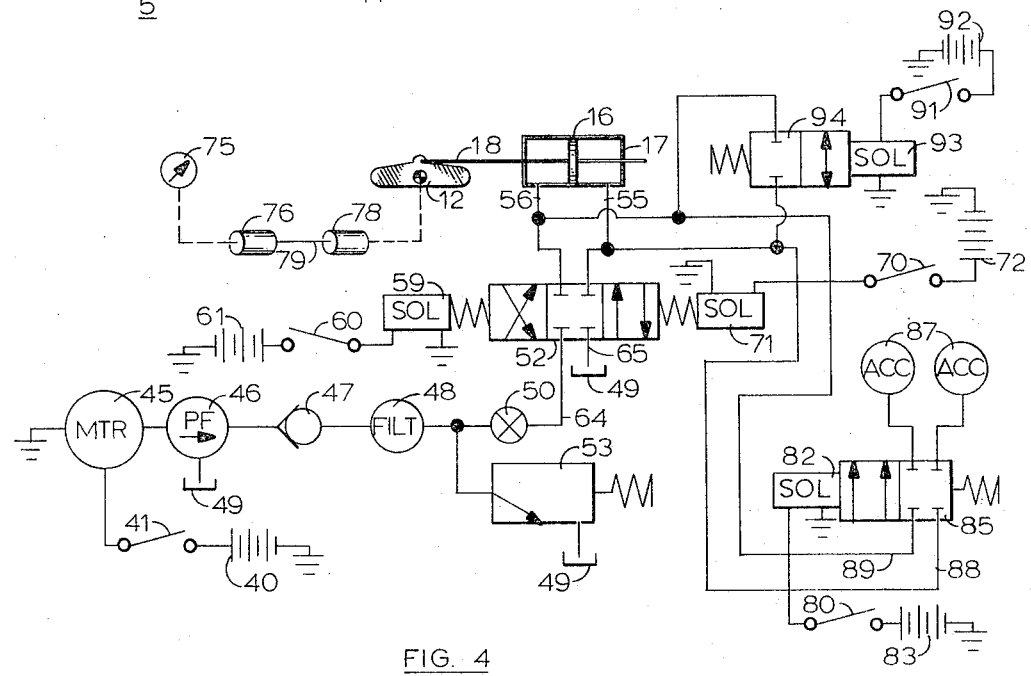
Figure 6:
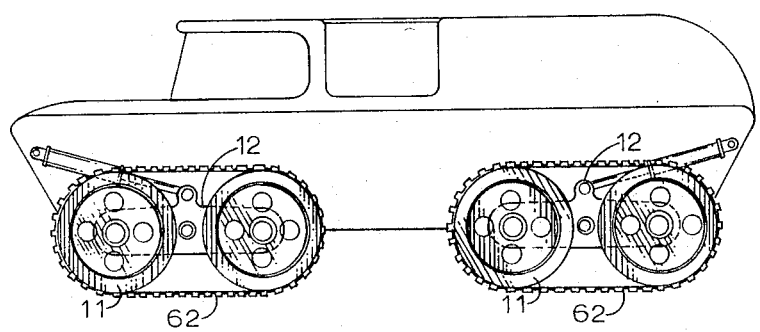

FIGS. 3a–3j are a series of illustrations showing some of the modes of operation of the device of the invention, FIG. 4 is a schematic drawing showing a control system which may be utilized for the walking beams of the device of the invention, FIG. 5 is a cross sectional view taken along the plane indicated by the line 5—5 in FIG. 2, and FIG. 6 is an illustration of an embodiment of the device of the invention utilizing separate tracks for each pair of wheels.

Figure 1:
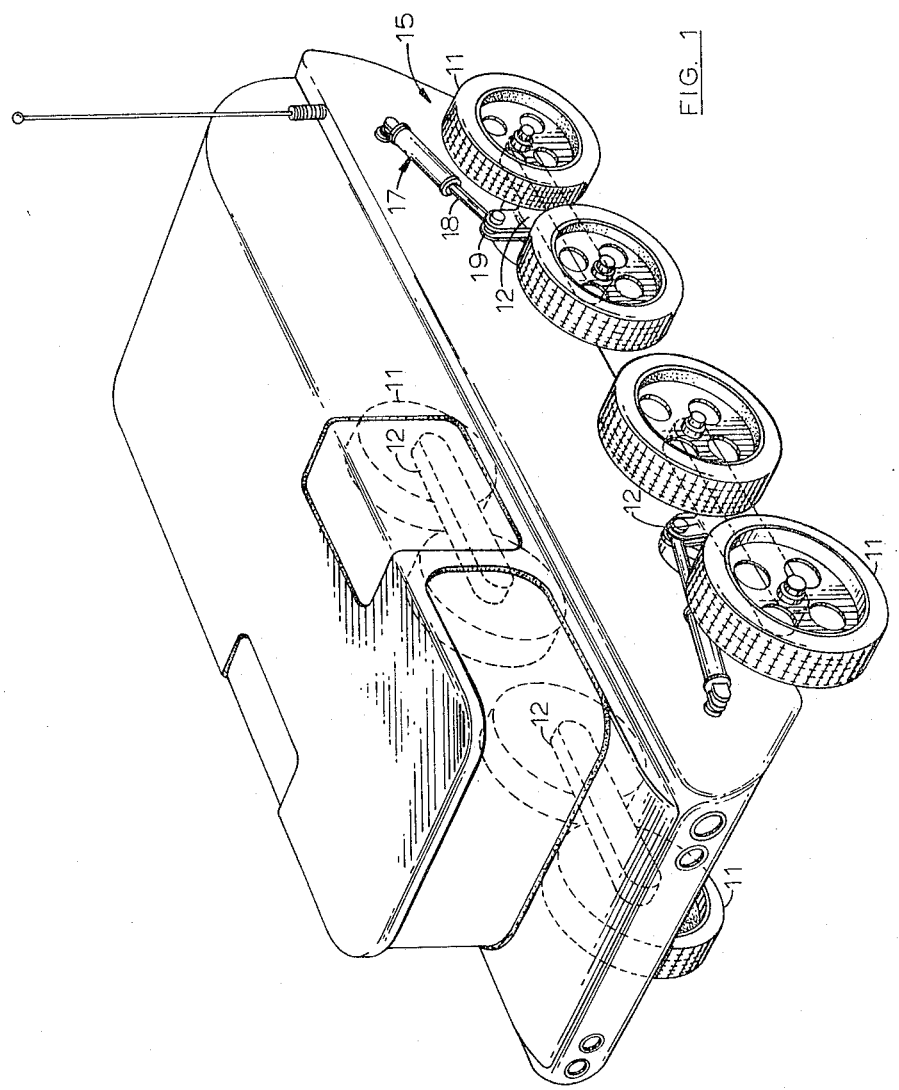
FIG. 1 is a perspective view of an embodiment of the device of the invention.

Referring to FIG. 1, an embodiment of the device of the invention is shown as incorporated into an exploration vehicle. The shape and configuration of the body of the vehicle illustrated is only one of many forms that may be utilized in conjunction with the device of the invention, which is concerned primarily with the mechanism associated with the pairs of wheels 11 and their associated support or walking beams 12.

Wheels 11 are rotatably mounted in pairs on support beams 12. There are thus four support beams 12, two on each side of the vehicle, each of such support beams rotatably carrying a pair of wheels 11.

Referring additionally to FIGS. 2 and 5, each wheel 11 is fixedly attached to an axle 20, which is in turn rotatably mounted on beam 12 by means of bearings 22.

Wheels 11 are rotatably driven in pairs on their respective bearings 22 by means of any suitable drive means such as an electric motor or transmission 25 which is driven by a suitable power source (not shown). Alternative drive means employing a gear motor at each wheel or a single motor mounted directly upon each walking beam may also be used.

Drive means is provided for each pair of wheels with a separate control therefor so that there is independent control of the rotation of each pair of wheels. The output shaft of motor 25 is connected to drive shaft 29 to which in turn are fixedly attached sprocket wheels 31 and 32. Shaft 29 is rotatably supported on support member 37 by means of bearings 38 and 39. Support member 37 is fixedly attached to the chassis of vehicle 15.

Each of wheels 11 has a sprocket wheel 33 fixedly attached thereto. Chain 34 engages sprocket wheel 32 and chain 36 engages sprocket wheel 31 and each of the chains engages an associated sprocket wheel 33 so as to provide simultaneous rotation of each pair of wheels in response to the rotation of shaft 29. Motor 25 is fixedly mounted on the frame of the vehicle 15 by means of support bracket 35. Wheels 11 are thus rotatably driven in pairs on their associated support beams 12 in response to separate motors 25 which are independently controlled. It is to be noted that each of the pairs of wheels 11 are similar in configuration and operate in the same fashion as described in connection with FIGS. 2 and 5. A suitable brake mechanism may be incorporated on each wheel.

Support beams 12 are hollow in configuration and provide a housing for the sprocket and chain drive mechanism for wheels 11 which has just been described.

Each beam is rotatably mounted on its associated support member 37 by means of bearings 42 and 43. Support beams 12 are rotatably driven on their support bearings 42 and 43 by means of an associated actuator such as hydraulic cylinder 17. The body of each of cylinders 17 is attached to the chassis of vehicle 15 by means of support pin 44. The piston rod 18 of each cylinder is rotatably mounted on a pin 51 which is fixedly attached to clevis 19. Clevis 19 is fixedly attached to or integrally formed with support beam 12.

Each of cylinders 17 has a separate hydraulic control system so as to enable the independent rotatable positioning of each support beam. Thus, with the extension and retraction of piston rod 18 with the actuation of its associated cylinder, support beam 12 is rotated accordingly on its support bearings. As for the motor drive for the wheels, each of the four support beam mechanisms is as illustrated in FIGS. 2 and 5.

Referring now to FIG. 6, an embodiment of the invention utilizing separate tracks for each pair of wheels is shown. This embodiment utilizes the same mechanism for each of the pairs of wheels as for the embodiment described in connection with FIGS. 1, 2, and 5 except for the addition of tracks 62 which link together each of the pairs of wheels 11. If so desired, the tracks can be removably attached to wheels 11 by any suitable means so that the wheels can either be operated in the fashion shown in FIGS. 1, 2, and 5 or with the tracks as shown in FIG. 6 as the situation may dictate. The embodiment of FIG. 6 is capable of more effective operation in traversing soft sand and the like. With such a split track configuration, the vehicle has greater reliability than normal tracked vehicles due to the capability to operate even if one or more of the tracks is shown. Also greater steering efficiency than possible with normal tracked vehicles can be achieved by positioning the support beams so that the centermost wheels are carrying the load (see FIG. 3c).

Referring now to FIG. 4, a hydraulic control system which may be utilized for actuation and control of each of the support beams is illustrated schematically. To place the system in operation switch 41 is closed, thereby applying power from power source 40 to motor 45. Motor 45 actuates pump 46 which draws hydraulic fluid out of reservoir 49 and pumps it through check valve 47, filter 48 and needle valve 50 to control valve 52. Relief valve 53 is provided to afford a pressure relief mechanism should the pressure in the lines running to control valve 52 exceed predetermined limits.

Running from hydraulic control valve 52 is hydraulic line 55 which runs to one side of piston 16 and hydraulic line 56 which runs to the other side of the piston. When solenoid 59 is actuated by the closing of switch 60, control valve 52 is actuated so as to connect line 65 to line 56 and line 64 to line 55. This causes hydraulic fluid to enter cylinder 17 in a fashion such as to drive piston 16 and piston rod 18 to the left. Piston rod 18 will be driven in this direction as long as switch 16 is kept closed.

If it is desired to drive piston rod 18 in the opposite direction, switch 60 is opened and switch 70 closed thereby supplying power to solenoid 71 from power source 72. This, as can be seen, reverses the hydraulic connections so that lines 64 and 65 are connected to lines 56 and 55 respectively.

The position to which support beam 12 has been rotated can be determined by the operator by means of indicator dial 75 which is driven by the output shaft of selsyn follower 76. The input shaft of selsyn generator 78 is connected to support beam 12 to rotate therewith and produces an electrical output signal which is coupled on line 79 to selsyn follower 76 which causes the selsyn follower to rotate therewith. The selsyn generator and follower are of types commercially available and are connected to a suitable excitation voltage source (not shown). Thus, the operator has a continuous indication of the rotational position of each of the support beams and can control these beams to produce any rotational combination thereof which may be required. When any desired position of the support beams has been reached, both switches 60 and 70 may be left in the open condition which deactuates control valve 52. This hydraulically locks the beam in the desired position. Motor 45 may be left on, with the hydraulic pressure produced thereby being relieved by means of relief valve 53.

Quite obviously only a single motor 45, pump 46, check valve 47, filter 48 and relief and needle valves 53 and 50 are required for all four support beams with the appropriate input line 64 for each of associated control valves 52 being connected to needle valve 50 as shown in FIG. 4.

If rather than a locking of the support beams, hydraulic damping action is desired, this may be achieved by closing switch 80 with switches 60 and 70 in the open condition. This connects power to solenoid 82 from power source 83, thereby actuating the solenoid and causing control valve 85 to connect accumulators 87 to lines 88 and 89 which in turn are connected to cylinder 17 through lines 55 and 56. Accumulators 87 which may be of a type commercially available provide an expansion path for the fluid contained in cylinder 17 and thereby furnish damping for piston 16. In this manner, it is possible to provide damped operation of the support beams in lieu of the rigid operation afforded in the locked mode of operation, such operation being particularly advantageous when running over bumpy surfaces. The hydraulic system is thus not only utilized for positioning and locking the support beams in the desired position but also may be utilized as a hydraulic shock absorbing mechanism.

If so desired, the walking beams may also be freed to enable the wheels to freely follow irregularities in the surfaces being traversed. This is accomplished by closing switch 91 to apply power to solenoid 93. This actuates control valve 94, thereby connecting the opposite ends of cylinder 17 to each other and substantially removing the hydraulic force imparted to beam 12.

While a hydraulic drive system has been shown, another type of drive mechanism could be utilized to rotatably position support beams 12 such as, for example, an electromechanical drive system. Such a system of course might not have the advantages of the optional damping mechanism associated with accumulators 87 which is possible with the hydraulic system disclosed. Further, a hydraulic or an electrical system which is capable of continual 360° rotation of support beams 12 may be utilized if so desired. This type of operation, of course, would enable the utilization of beams 12 in end over end operation for the locomotion of the vehicle which would provide certain advantages in traversing over very soft surface, marshy areas or in adapting the vehicle for amphibious operation.

Referring now to FIGS. 3a–3j, some of the ways in which the device of the invention may be operated are illustrated.

Figure 3A:
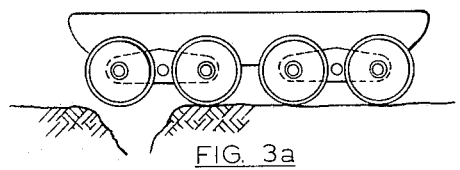

In FIG. 3a, the capability of the device of the invention for traversing crevices and depressions is illustrated. As shown in FIG. 3a, the vehicle is supported on six wheels while the front wheels traverse the crevice and is supported on combinations of six wheels as the wheels successively passes over the crevice area. Thus as can be seen, bridging operation similar to that of a tracked vehicle is possible without the disadvantages of such a track vehicle.

Figure 3B:
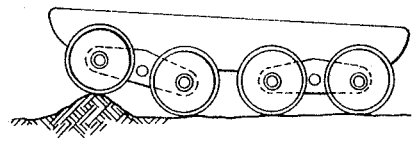

Referring to FIG. 3b, the ability of the vehicle to traverse a raised bump is illustrated. Assuming that the front pair of wheels could not ride over the bump, the front pairs of walking beams are rotated as indicated in FIG. 3b to bring them on top of the bump. As each wheel comes up against the bump, its associated walking beam can be similarly positioned to provide the desired traversing action.

Figure 3C:
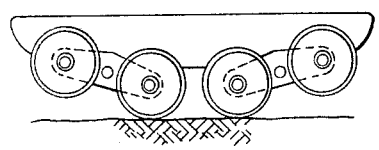

Referring now to FIG. 3c, the vehicle is shown supported on the center wheels, this being achieved by appropriate positioning of the support beams. In this manner, the entire load is carried on the centermost wheels, thereby affording more efficient turning maneuverability where this may be called for.

Figure 3D:
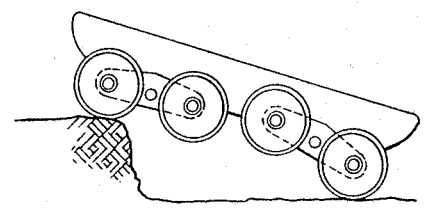

Referring now to FIG. 3d, the climbing capability of the device of the invention is illustrated. Such climbing, as can be readily seen can be achieved by appropriately successively rotating and locking the support beams, thereby using them as levers to bring the vehicle over an abrupt obstacle to be traversed.

Figure 3E:
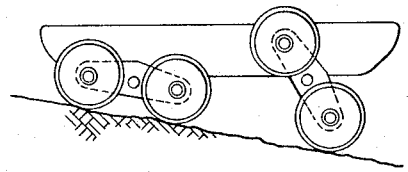
Figure 3F:
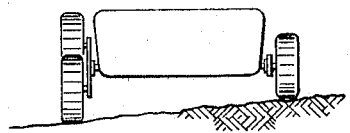

Referring now to FIGS. 3e and 3f, the operation of the support beams to level the vehicle while on a slope or obstacle is illustrated. Thus, the beams can be rotated as desired and locked in position so as to maintain a level condition.

Figure 3G:
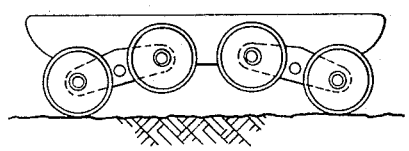

Referring now to FIG. 3g, the vehicle is shown supported on the end wheels. This type of operation may afford certain advantages by providing higher ground pressure at the extreme ends of the vehicle which may under certain conditions of operation prove advantageous by increasing the vehicles' lateral or yaw stability.

Figure 3H:
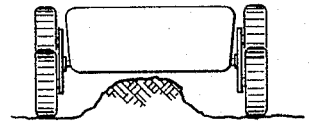

FIG. 3h illustrates how the rotation of all of the walking beams may be used to raise the chassis of the vehicle off the ground so as to permit such chassis to pass over an obstacle or be extricated from an obstacle on which it may become engaged. Such raising of the vehicle also may have its advantages in enabling better observation.

Figure 3I:
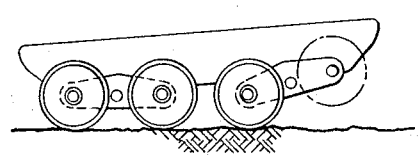

Referring now to FIG. 3i, the operation of the vehicle on six or seven wheels is shown should one or two of the wheels become damaged. In such an event, it is merely necessary to rotate the appropriate beam so as to bring the damaged wheel or wheels off the ground. The wheels in question can either be repaired or replaced without any necessity for jacking up the vehicle. Also if there is an emergency requirement for same, wheels can be removed and utilized for other purposes without disabling the vehicle.

Figure 3J:
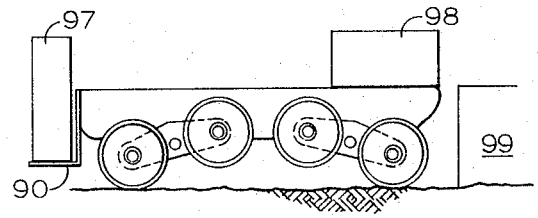

FIG. 3j illustrates how the support beams can be utilized to operate the vehicle as a fork lift and handling truck merely by attaching an appropriate carrying mechanism 90 to the front end thereof. Cargo 97 can be lifted off the ground merely by rotating the support beams so as to raise the vehicle. The support beams can also be raised or lowered as necessary to bring a payload 98 to the proper position for easy transfer such as to another vehicle or loading dock 99.

The device of the invention thus provides a versatile vehicle especially suitable for operating in remote and unexplored areas which can not only be utilized for exploration but for other general purposes as well. As the operation of the vehicle is not dependent on any continued functioning of all of the wheels thereof, high reliability is assured. The support beams can readily be positioned to provide optimum utilization of the wheels for the particular conditions encountered.

While the device of the invention has been described and illustrated in detail it is to be clearly understood that this is intended by way of illustration and example only and is not to be taken by way of limitation, the spirit and scope of this invention being limited only by the terms of the following claims.

I claim:

1. A surface vehicle comprising
 a rigid one-piece chassis,
 at least four pairs of wheels,
 a walking beam for supporting each pair of said wheels for rotation about axes parallel to each other with one wheel of each pair near one end of its associated beam and the other wheel of each pair near the opposite end thereof, said support beams being arranged symetrically on opposite sides of said chassis,
 means for supporting each of said beams at substantially the center thereof on said chassis for rotation about axes substantially parallel to the rotation axes of said wheels,
 means for separately positioning each of said beams about its associated rotation axis,
 means for sensing and indicating the rotational position of each of said walking beams, and
 means for alternatively either rigidly locking each of said beams in any preselected position, constraining each of said beams in a damped manner in any preselected position, or permitting said beams rotational freedom about their associated rotation axes.

2. The vehicle as recited in claim 1 wherein said means for positioning said beams and said means for alternatively locking, constraining, or permitting said beams rotational fredom comprises a hydraulic system including a hydraulic drive cylinder connected to drive each of said beams, and control means for separately controlling each of said drive cylinders.

3. The vehicle as recited in claim 1 and additionally including a track connected betwen each of said pairs of wheels.

4. A surface vehicle comprising
 a rigid one-piece chassis,
 at least four pairs of wheels,
 a walking beam for rotatably supporting each of said pairs of wheels,
 means for rotatably supporting each of said walking beams at substantially the center thereof on said chassis, said walking beams being arranged symmetrically on opposite sides of said chassis,
 means for separately rotatably driving each of said pairs of wheels on said walking beams,
 means for sensing and indicating the rotational position of each of said walking beams, and
 hydraulic means for independently rotatably positioning each of said walking beams relative to said chassis, said hydraulic means including means for alternatively rigidly locking each of said beams in any preselected position, constraining said beams in a damped fashion, or permitting said beams rotational freedom.

5. The vehicle as recited in claim 4 wherein said hydraulic means comprises a hydraulic drive cylinder for each of said beams, the body of each of said cylinders being attached to said chassis, the drive rod of each of said cylinders being attached to an associated walking beam, and hydraulic control means for controlling the fluid flow to each of said cylinders, said control means including valve means for alternatively either causing directional fluid flow to said cylinders, connecting accumulator means to said cylinders, or causing said cylinders to be bypassed.

References Cited by the Examiner

UNITED STATES PATENTS

| | | | |
|---|---|---|---|
| 2,393,324 | 1/1946 | Joy | 180—22 X |
| 2,878,883 | 3/1959 | France. | |
| 2,978,254 | 4/1961 | Bundorf. | |
| 3,063,510 | 11/1962 | Hunger | 180—9.2 |
| 3,182,741 | 5/1965 | Roach | 305—10 X |
| 3,262,522 | 7/1966 | Johnson | 180—9.2 X |

BENJAMIN HERSH, *Primary Examiner.*

RICHARD J. JOHNSON, *Examiner.*